R. AREY.
Hand-Planters.
No. 136,688.
Patented March 11, 1873.
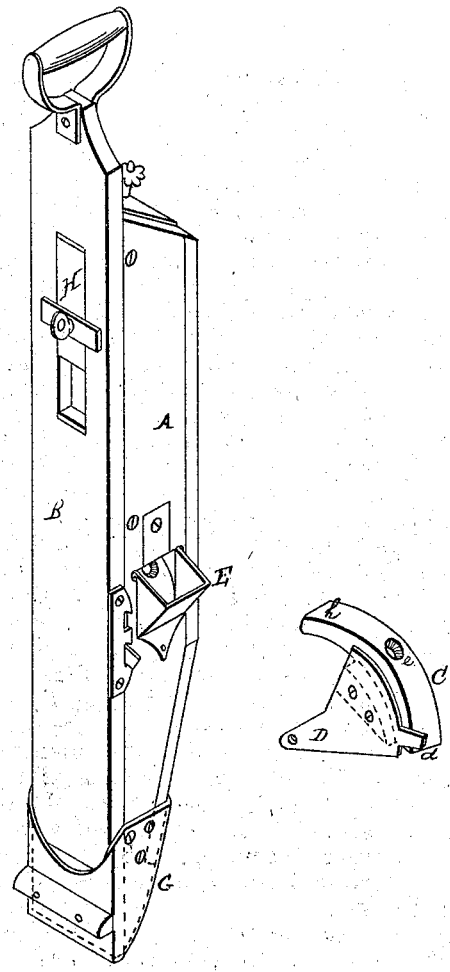
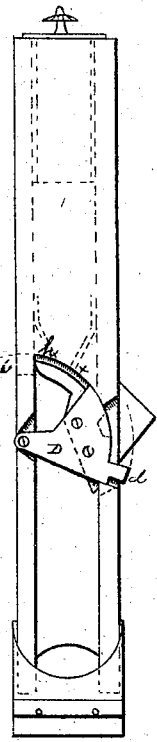
Fig. 1.
Fig. 2.
Witness:
Henry N. Miller
C. L. Evert
Inventor.
Richard Arey
per
Saunders Mason
Attorneys.

UNITED STATES PATENT OFFICE.

RICHARD AREY, OF ROCK FALLS, ILLINOIS, ASSIGNOR TO ALBERT M. PHELPS AND FAYETTE DYER.

IMPROVEMENT IN HAND-PLANTERS.

Specification forming part of Letters Patent No. 136,688, dated March 11, 1873.

*To all whom it may concern:*

Be it known that I, RICHARD AREY, of Rock Falls, in the county of Whitesides and in the State of Illinois, have invented certain new and useful Improvements in Hand Seed-Planters; and do hereby declare that the following is a full, clear, and exact description thereof, reference being had to the accompanying drawing and to the letters of reference marked thereon making a part of this specification.

The nature of my invention consists in the construction of a visible-stop drop-hand planter, as will be hereinafter described.

In the annexed drawing making a part of this specification, A represents the seed-box of a hand corn or seed planter, which is constructed in any of the well-known and usual ways. B represents the ordinary plunger, which serves to operate the seed-slide and at the same time to thrust the seed from the box into the ground. G represents the nozzle of the machine, which is made of metal, as usual, and attached to the lower end of the box. One side of this nozzle is of course movable—that is, it is either hinged or secured to the nozzle by means of a spring, so that it will allow the end of the plunger to pass through in thrusting the grain into the ground. This side may be either a separate plate with elasticity to spring when operated against by the plunger, or it may be hinged to and form a part of the nozzle. C represents a curved seed-slide, which is connected to a metallic plate, D, the two forming a quadrant slide. The slide C has a seed-opening, $e$, in its face, and has an extension, $h$, which passes through an opening, $i$, in the side of the box A to assist in keeping in position the said slide and to close the bottom of the seed-box. The plate D is pivoted at one end in a recess in the side of the box A, and is provided with a lug, $d$, which plays in a slot or recess in the opposite side of the box. This lug $d$ is caught in an opening in a plate which is secured to the plunger, so that when the plunger is given a reciprocating motion the slide is given by it a partial rotary motion backward and forward within the seed-box. Upon the outside of the box A is a cup, E, which is open at its upper end, while its lower end connects or opens directly into the box A. When the slide C receives corn from the seed-chamber and is then partially rotated, the grain-opening $e$ passes under a suitable cut-off at $x$, and discharges the same in the cup E, where it is detained temporarily. This detention is secured by having the lower portion or end of the slide C fit closely to the connection between the cup E and the box A. When the slide C passes back to receive another charge of grain the grain just deposited in cup E is freed and drops down into the nozzle, and from thence is of course carried into the ground by the plunger. The lower end of slide C alternately opens and closes the lower end of cup E, so as to detain and then drop the grain deposited in it, and thus forms a visible-drop planter.

The distance which the plunger moves is regulated by means of a block, H, which is secured to the box A, and which slides in a slot in the plunger. By shortening this block the stroke of the plunger is lengthened, or vice versa.

Having thus fully described my invention, what I claim as new, and desire to secure by Letters Patent, is—

The quadrantal-shaped slide C provided with opening $e$ and extension $h$, and secured to the pivoted plate D, in combination with a seed-box, A, substantially as set forth.

In testimony that I claim the foregoing I have hereunto set my hand this 11th day of January, 1873.

RICHARD AREY.

Witnesses:
F. DYER,
E. MERRIHEW.